US008891836B2

(12) United States Patent
Hara et al.

(10) Patent No.: US 8,891,836 B2
(45) Date of Patent: Nov. 18, 2014

(54) STRIPE PATTERN IMAGE ANALYSIS DEVICE, STRIPE PATTERN IMAGE ANALYSIS METHOD, AND PROGRAM THEREOF

(75) Inventors: Masanori Hara, Tokyo (JP); Hiroaki Toyama, Tokyo (JP)

(73) Assignee: Nec Corporation, Tokyo (JP)

( * ) Notice: Subject to any disclaimer, the term of this patent is extended or adjusted under 35 U.S.C. 154(b) by 539 days.

(21) Appl. No.: 13/244,214

(22) Filed: Sep. 23, 2011

(65) Prior Publication Data

US 2012/0057764 A1 Mar. 8, 2012

Related U.S. Application Data

(63) Continuation of application No. PCT/JP2010/052585, filed on Feb. 16, 2010.

(30) Foreign Application Priority Data

Mar. 25, 2009 (JP) .................................. 2009-074501

(51) Int. Cl.
*G06K 9/00* (2006.01)
(52) U.S. Cl.
CPC ................................. *G06K 9/00093* (2013.01)
USPC ........................................................ 382/124
(58) Field of Classification Search
CPC ...................................................... G06K 9/00093
USPC ........................................ 382/115, 124, 125
See application file for complete search history.

(56) References Cited

U.S. PATENT DOCUMENTS

| | | | | |
|---|---|---|---|---|
| 2002/0181782 | A1* | 12/2002 | Monden | 382/215 |
| 2004/0101173 | A1 | 5/2004 | Hara et al. | |
| 2007/0047777 | A1* | 3/2007 | Adachi et al. | 382/124 |
| 2007/0165914 | A1* | 7/2007 | Werthiem et al. | 382/124 |
| 2007/0230754 | A1* | 10/2007 | Jain et al. | 382/125 |

FOREIGN PATENT DOCUMENTS

| | | |
|---|---|---|
| JP | 63-150768 | 6/1988 |
| JP | 02-257258 | 10/1990 |
| JP | 7160236 | 6/1995 |
| JP | 2885787 | 4/1999 |

(Continued)

OTHER PUBLICATIONS

JP Office Action dated May 28, 2013, with English translation; Application No. 2009-074501.

(Continued)

*Primary Examiner* — Samir Ahmed
(74) *Attorney, Agent, or Firm* — Young & Thompson

(57) ABSTRACT

Provided is a stripe pattern image analysis device by which a burden of an appraiser regarding a new charting point searching designation operation can be reduced. The device includes a charting point modification element obtaining or modifying a first point located on a first stripe pattern image displayed in a first window, and a second point which is corresponding to the first point and located on a second stripe pattern image displayed in a second window; a nonlinear coordinate transformation element transforming the first stripe pattern image using a nonlinear coordinate transformation so that a first coordinate of the first point in the first window matches a second coordinate of the second point in the second window; and a charting figure edit and display element displaying the first stripe pattern image, transformed by the nonlinear coordinate transformation element by use of the nonlinear coordinate transformation, in the first window.

9 Claims, 14 Drawing Sheets

SIDE BY SIDE DISPLAY OF LATENT FINGERPRINT AND INKED FINGERPRINT o WHICH IS NOT TRANSFORMED

(56) References Cited

FOREIGN PATENT DOCUMENTS

| | | |
|---|---|---|
| JP | 3330414 | 9/2002 |
| JP | 2003-036443 | 2/2003 |
| JP | 3381805 | 3/2003 |
| JP | 2004-078434 | 3/2004 |
| JP | 2004-295383 | 10/2004 |
| JP | 3704486 | 10/2005 |
| JP | 2007-102422 | 4/2007 |
| JP | 4030830 | 1/2008 |
| JP | 2009-028167 | 2/2009 |
| JP | 4531670 | 8/2010 |

OTHER PUBLICATIONS

International Search report, PCT/JP2010/052585, Mar. 16, 2010.

\* cited by examiner

EXAMPLE OF FINGERPRINT IMAGE

EXAMPLE OF LATENT
FINGERPRINT
(LEFT SIDE IMAGE)

EXAMPLE OF INKED
FINGERPRINT
(RIGHT SIDE IMAGE)

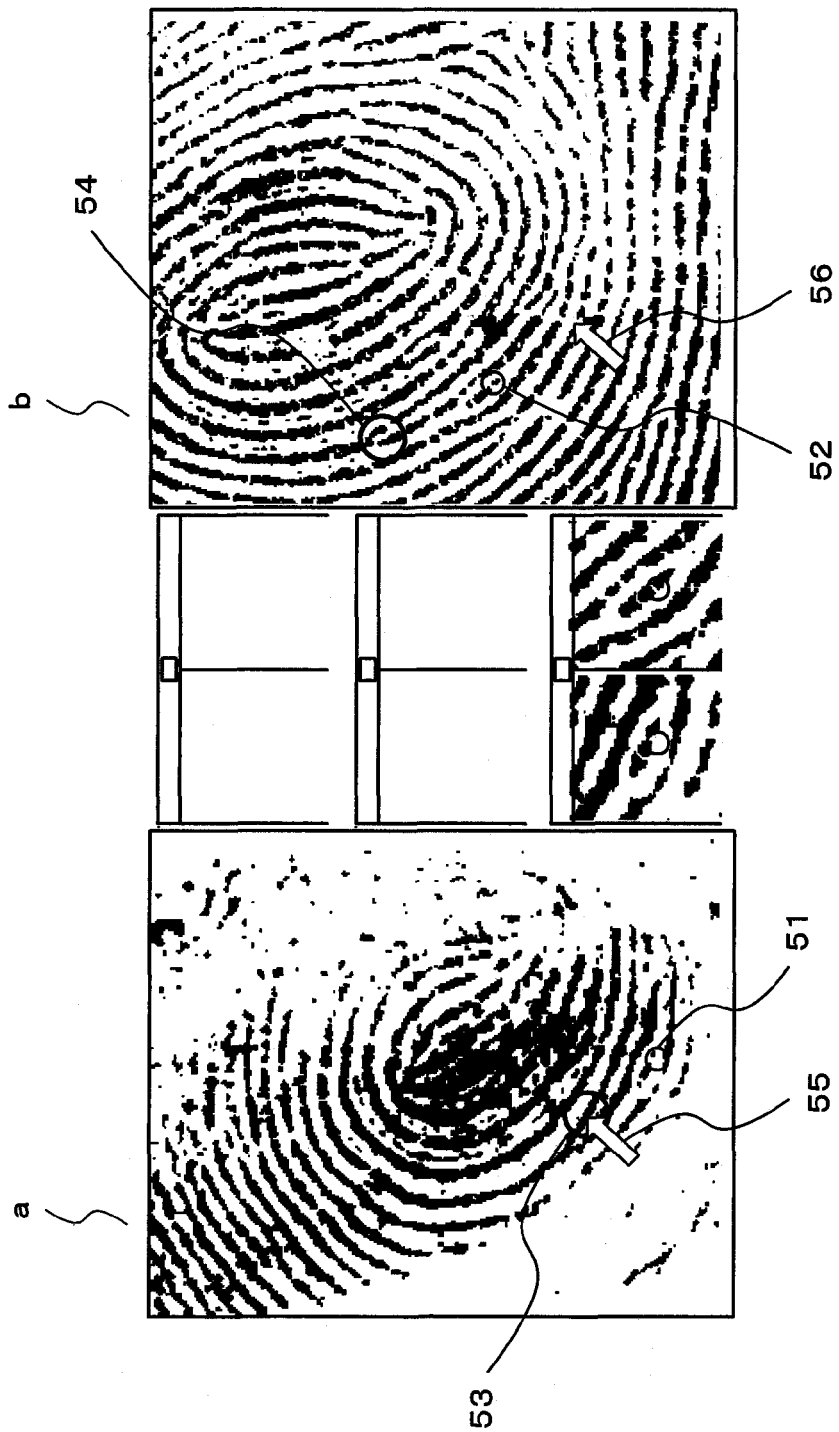
Fig.5 SIDE BY SIDE DISPLAY OF LATENT FINGERPRINT AND INKED FINGERPRINT o WHICH IS NOT TRANSFORMED SIDE BY SIDE DISPLAY OF LATENT FINGERPRINT
AND INKED FINGERPRINT L POSTERIOR TO LINEAR TRANSFORMATION SIDE BY SIDE DISPLAY OF LATENT FINGERPRINT AND INKED FINGERPRINT N POSTERIOR TO NONLINEAR TRANSFORMATION Fig. 10A  EXAMPLE OF CHARTING: WITH NO POSITION ALIGNMENT
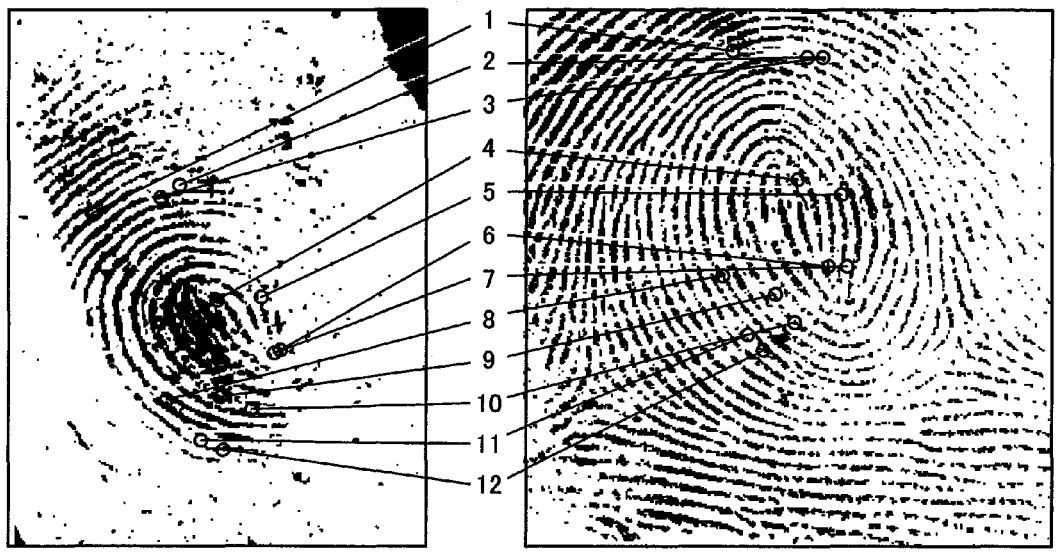
Fig. 10B  EXAMPLE OF CHARTING: WITH POSITION ALIGNMENT
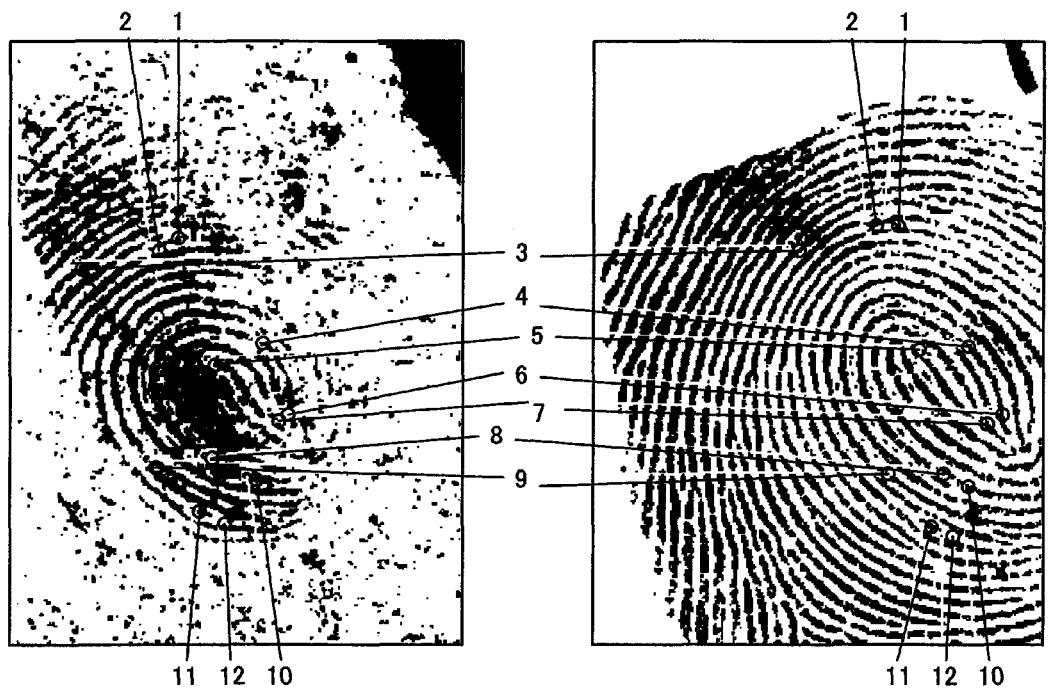

SIDE BY SIDE DISPLAY OF LATENT FINGERPRINT
AND INKED FINGERPRINT L POSTERIOR TO LINEAR TRANSFORMATION

SIDE BY SIDE DISPLAY OF LATENT FINGERPRINT
AND INKED FINGERPRINT N POSTERIOR TO NONLINEAR TRANSFORMATION

STRIPE PATTERN IMAGE ANALYSIS DEVICE, STRIPE PATTERN IMAGE ANALYSIS METHOD, AND PROGRAM THEREOF

TECHNICAL FIELD

The present invention relates to a stripe pattern image analysis device, a stripe pattern image analysis method and a program thereof which support to judge whether stripe pattern images are different each other, and particularly relates to a stripe pattern image analysis device, a stripe pattern image analysis method and a program thereof which support to analyze two images of, for example, a fingerprint or a palm print (judge whether or not the two images are taken, for example, from the same finger or palm).

BACKGROUND ART

Since a fingerprint, which is composed of a plurality of ridges in a stripe pattern, has two remarkable features that the fingerprint is invariable throughout life and the fingerprints of any two persons are different each other, the fingerprint has been used as a means to recognize a person from the old days.

According to the analysis of the fingerprint, an examiner compares two fingerprint data, and analyzes visually whether features on the fingerprint ridges match each other. Then, the examiner judges that two fingerprints are identical each other, in the case that number of the ridge features, which become paired out of two fingerprint data, becomes not smaller than a predetermined number.

Here, the ridge feature of the fingerprint means an end point or a bifurcation of a line which composes the stripe. The ridge features which become paired out of two data (in this case, fingerprint data) are called corresponding ridge features.

In many cases, not only the ridge feature such as the end point or the bifurcation but also other detailed features of the ridges, for example, a short line (dot) or a sweat pore are used for the judgment on identity. Accordingly, the ridge feature used for the judgment on the existence of difference between the fingerprints includes not only the end point or the bifurcation but also another detailed feature of the ridge.

In a trial, a document, which indicates a relation between authorized corresponding ridge features, is submitted together with two fingerprint photographs and two fingerprint gray images which are arranged adjacently. According to the trial in many countries, two fingerprints are judged to be identical each other in the case that about 12 corresponding ridge features are found out of the two fingerprint data. Details are described on 190 to 193 pages of non-patent document 1; "The Science of Fingerprints-Classification and Uses (John Edgar Hoover, US DOJ, FBI; 1963)".

In recent years, a fingerprint matching system using a computer becomes prevailing, and consequently documentary evidence for the trial is also created by use of a computer in many cases. A function to edit and display two fingerprints so that the corresponding ridge features may be displayed clearly is called to be the Charting Function and is prevailing in USA in particular.

According to the Charting Function, two fingerprints are displayed adjacently, that is, one is arranged on the left side and the other is arranged on the right side so that the judgment on the existence of difference may be carried out easily. The display method mentioned above is called to be a side by side display. A figure and a screen which are displayed with the side by side display method are called to be a charting figure and a charting screen respectively. Two corresponding points are called to be charting points. A line, which ties two charting points, is also displayed in many cases. The line is called to be a charting line. The judgment on the existence of difference between the fingerprints is also called to be a fingerprint analysis.

The Charting Function, which is carried out semi-automatically by use of an automatic matching function, has been realized already. According to the semi-automatic Charting Function, it is unnecessary that the examiner inputs information on all corresponding ridge features by a manual operation. The ridge features, which become corresponding, are extracted by the automatic matching function, and then the corresponding ridge features are displayed automatically as the charting point. The examiner checks and modifies the corresponding ridge features which are displayed.

FIG. 10A and FIG. 10B show examples of the charting figures which are displayed by the charting function. FIG. 10A is the example of the charting figure to make a relation between the corresponding charting points clear through tying the charting points by the charting line and assigning the same number to the corresponding charting points. FIG. 10B is the example of display which is obtained through carrying out a linear transformation (rotation and parallel movement) for one image (right side fingerprint) of the fingerprint data of the charting figure shown in FIG. 10A so that the corresponding charting points are arranged almost horizontally.

Here, a technical document, which is applied before the present application, discloses a method to make the visual judgment on the existence of difference easy, for example, through modifying an image distortion so that one fingerprint image may match the other fingerprint image, and displaying two fingerprint images adjacently (for example, refer to patent document 1).

The patent document 1 mentioned above discloses a method to modify the image distortion on the basis of a distance between corresponding ridge features and a core of the fingerprint.

It is difficult to use the method mentioned above in the case that coordinates of the corresponding ridge features does not always match each other and there is no core of the fingerprint. The fingerprint with no core is, for example, an arched fingerprint or a latent fingerprint (partial fingerprint) whose core is not taken.

It is difficult to apply the modification method, which is disclosed in the above-mentioned patent document 1, to modification of the image of the above-mentioned fingerprint.

Patent document 2 discloses a method to support the analysis through modifying image distortion of one image out of two images perfectly by use of a large amount of corresponding points of the skeletons outputted as a result of skeleton matching, and overlapping the one image with the other image.

It is impossible to use the method in the case that coordinates of the corresponding ridge features do not always match each other, and the skeleton matching fails due to degraded quality of the image. Moreover, in the case that the method is applied to the latent fingerprint with low quality, the examiner must input skeleton data by a manual operation, and consequently, a work load of the examiner becomes severe.

Patent document 3 discloses an art to compare a plurality of images with ease through making a display means display simultaneously the images which photograph an eye in plural different states and include an identical photographing area.

Patent document 4 discloses an art which enables to compare simultaneously two different three-dimensional surface rendering images or the like, or to observe at once a state of three-dimensional distribution related to a plurality of different wall movement information.

THE PRECEDING TECHNICAL DOCUMENT

Patent Document

[Patent document 1] Japanese Patent Publication No. 2885787
[Patent document 2] Japanese Patent Application Laid-Open No. 2004-078434
[Patent document 3] Japanese Patent Application Laid-Open No. 1994-269413
[Patent document 4] Japanese Patent Application Laid-Open No. 2009-28167

Non-Patent Document

[Non-patent Document 1] Page 193 to 196 of "The Science of Fingerprints Classification and Uses" (by John Edgar Hoover, US DOJ, FBI; Rev. 12-84 and 1990)

DISCLOSURE OF INVENTION

Problem to be Solved by the Invention

In the case that a device with the Charting Function fails in the automatic matching due to quite low quality of the latent fingerprint, and consequently can not extract the corresponding ridge features, the examiner must make all charting points corresponding to each other in the fingerprint analysis. Therefore, there is a problem that a work load of the examiner is heavy.

A usual procedure to make the charting points corresponding to each other is as follows.

Step 1: The examiner compares two fingerprints and determines the charting points which should be corresponding.

Step 2: The examiner designates a position of the determined ridge feature on one fingerprint.

Step 3: The examiner designates a position of the determined ridge feature on the other fingerprint.

Here, the designation of the position in Steps 2 and 3 is usually carried out by use of a pointing device such as a mouse and a tablet pen. However, the work load of the examiner becomes heavy if a distance of the pointing device's moving in order to designate the position is long.

The present invention is conceived in consideration of the above mentioned situation. An object of the present invention is to provide a stripe pattern image analysis device, a stripe pattern image analysis method and a program thereof to be able to reduce the work load of the examiner or the like which is generated in the operation of searching and designating new charting points.

Means for Solving the Problem

In order to achieve the object, the present invention has the following feature.

<Stripe Pattern Image Analysis Device>

A stripe pattern image analysis device according to the present invention comprises:

a charting point modification means for obtaining or modifying a first point located on a first stripe pattern image displayed in a first window, and a second point which is corresponding to the first point and located on a second stripe pattern image displayed in a second window;

a nonlinear coordinate transformation means for transforming the first stripe pattern image by use of a nonlinear coordinate transformation so that a first coordinate of the first point in the first window matches a second coordinate of the second point in the second window; and a charting figure edit and display means for displaying the first stripe pattern image, transformed by the nonlinear coordinate transformation means by use of the nonlinear coordinate transformation, in the first window.

<Stripe Pattern Image Analysis Device Method>

A stripe pattern image analysis method according to the present invention comprises:

carrying out a charting point modification for obtaining or modifying a first point located on a first stripe pattern image displayed in a first window, and a second point which is corresponding to the first point and located on a second stripe pattern image displayed in a second window;

carrying out a nonlinear coordinate transformation for transforming the first stripe pattern image by use of a nonlinear coordinate transformation so that a first coordinate of the first point in the first window matches a second coordinate of the second point in the second window; and carrying out a charting figure edit and display for displaying the first stripe pattern image, which is transformed by use of the nonlinear coordinate transformation in the nonlinear coordinate transformation, in the first window.

<Program>

A program according to the present invention makes a computer execute:

a charting point modification process to obtain or to modify one a first point located on a first stripe pattern image displayed in a first window and a second point which is corresponding to the first point and located on a second stripe pattern image displayed in a second window;

a nonlinear coordinate transformation process to transform the first stripe pattern image by use of a nonlinear coordinate transformation so that a first coordinate of the first point in the first window matches a second coordinate of the second point in the second window; and a charting figure edit and display process to display the first stripe pattern image, which is transformed by use of the nonlinear transformation in the nonlinear coordinate transformation process, in the first window.

Effect of the Invention

According to the present invention, it is possible to reduce the work load of the examiner or the like which is generated in the operation of searching and designating new charting points.

BRIEF DESCRIPTION OF DRAWINGS

FIG. 5 shows an example of side by side display of the latent fingerprint and the inked fingerprint which is not transformed.

FIG. 10A is a diagram (1) showing an example of the charting related to the present invention.

FIG. 10B is a diagram (2) showing an example of the charting related to the present invention.

DESCRIPTION OF CODES

Figure 1:
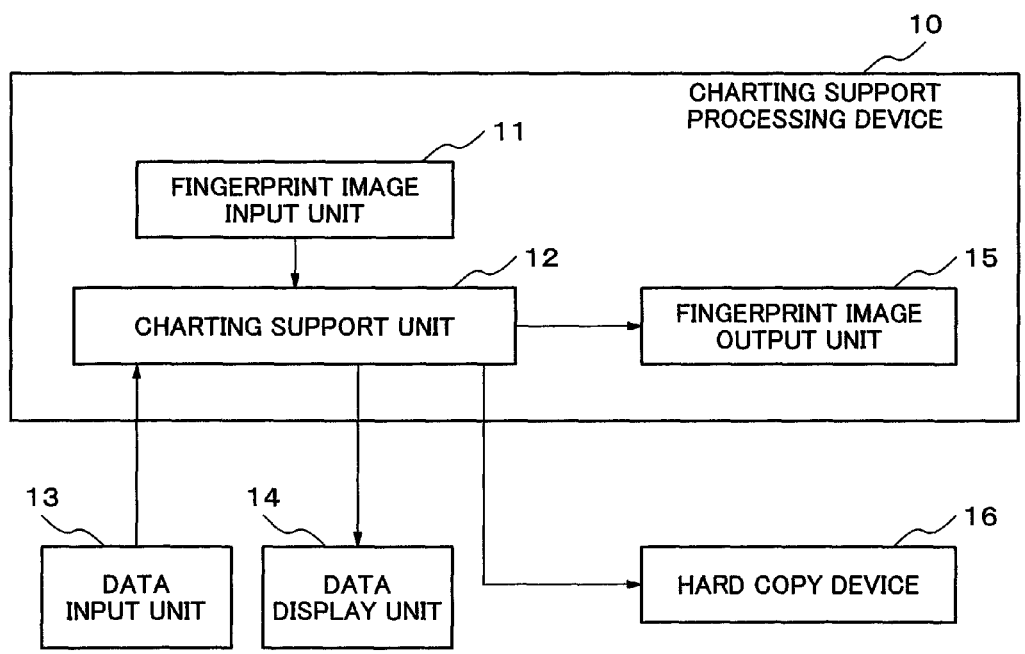
FIG. 1 shows an example of a whole of configuration of a charting support processing device 10 according to an exemplary embodiment.

10 Charting support processing device
11 Fingerprint image input unit
12 Charting support unit
13 Data input unit
14 Data display unit
15 Fingerprint image output unit
16 Hard copy device
17 Stripe pattern image analysis device
21 Data processing control unit
22 Data storage unit
23 Charting point modification unit
24 Linear coordinate transformation unit
25 Nonlinear coordinate transformation unit
26 Corresponding point coordinate table creation unit
27 Corresponding point coordinate retrieval unit
28 Charting figure edit and display unit

MOST PREFERRED MODE TO CARRY OUT THE INVENTION

<Outline of Stripe Pattern Image Analysis Device According to Exemplary Embodiment of Present Invention>

Figure 14:
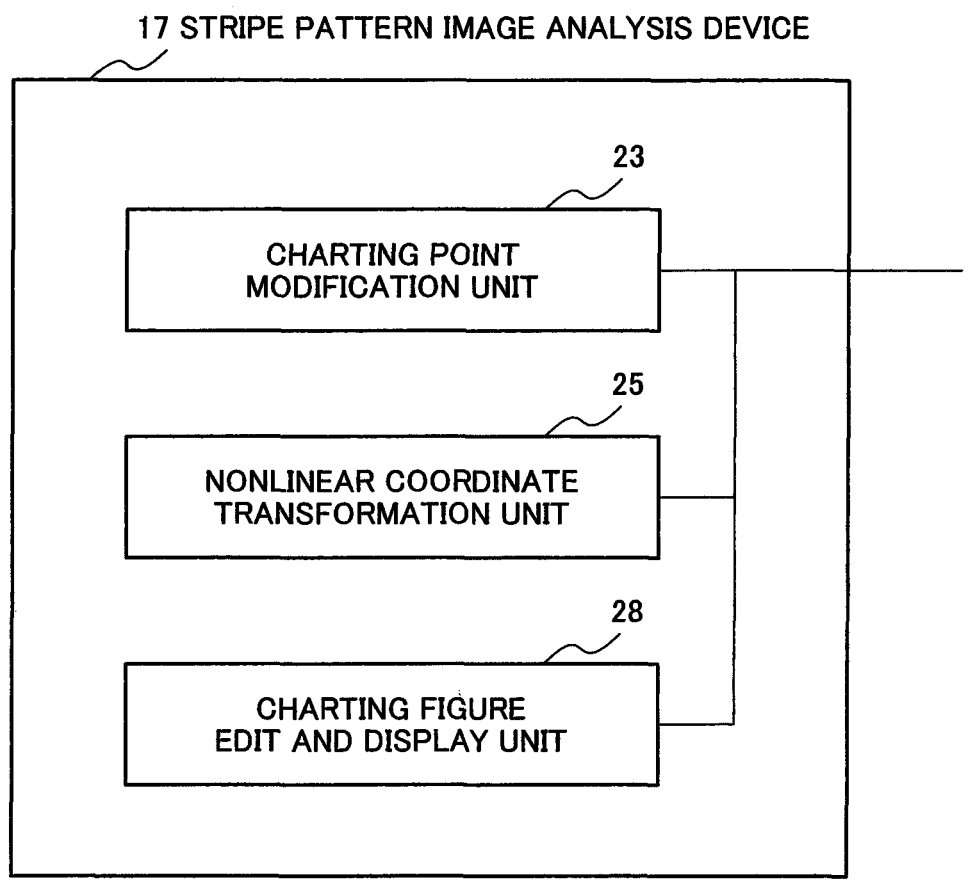
FIG. 14 shows an example of a whole of configuration of a stripe pattern image analysis device 17 according to an exemplary embodiment.

FIG. 14 shows an outline of a stripe pattern image analysis device 17 according to an exemplary embodiment of the present invention.

The stripe pattern image analysis device 17 according to the exemplary embodiment of the present invention comprises:

a charting point modification means 23 for obtaining or modifying a first point located on a first stripe pattern image displayed in a first window, and a second point which is corresponding to the first point and located on a second stripe pattern image displayed in a second window;

a nonlinear coordinate transformation means 25 for transforming the first stripe pattern image by use of a nonlinear coordinate transformation so that a first coordinate of the first point in the first window matches a second coordinate of the second point in the second window; and a charting figure edit and display means 28 for displaying the first stripe pattern image transformed by the nonlinear coordinate transformation means by use of the nonlinear coordinate transformation, in the first window.

According to the stripe pattern image analysis device 17 of the exemplary embodiment of the present invention, by virtue of the configuration mentioned above, it is possible to reduce a work load of an examiner or the like which is generated in an operation of searching and designating a new charting point. Hereinafter, the stripe pattern image analysis device 17 according to the exemplary embodiment of the present invention will be described in detail with reference to a drawing. Here, a charting support processing device 10 is exemplified in the following description. However, the stripe pattern image analysis device 17 according to the exemplary embodiment is not limited to the charting support processing device 10.

A First Exemplary Embodiment

<Example of Configuration of Charting Support Processing Device 10>

FIG. 1 shows an example of a configuration of the charting support processing device 10.

The charting support processing device 10 includes a fingerprint image input unit 11, a charting support unit 12, a data input unit 13, a data display unit 14, a fingerprint image output unit 15 and a hard copy device 16.

The fingerprint image input unit 11 digitizes and obtains a fingerprint image which is read, for example, by a sensor and a scanner. It may be preferable that the fingerprint image input unit 11 obtains an image, which has been already digitized, as a file.

The charting support unit 12 has a charting function to support judgment on identity of fingerprints in two fingerprint images which are provided by the fingerprint image input unit 11.

The data input unit 13, which is an input device called to be a pointing device such as a mouse and a tablet, obtains data such as position of a point designated by an examiner, and an instruction of the examiner.

The data display unit 14, which is, for example, a monitor display device or the like, displays charting data such as the fingerprint image, a charting point and a charting line.

The fingerprint image output unit 15 outputs a transformed image which is processed by the charting support unit 12, and provides an external system, an external storage medium or the like with the outputted image.

The hard copy device 16, which is a printing device such as a printer, prints and outputs an analysis result (charting screen) or the like.

<Example of Configuration of Charting Support Unit 12>

Figure 2:
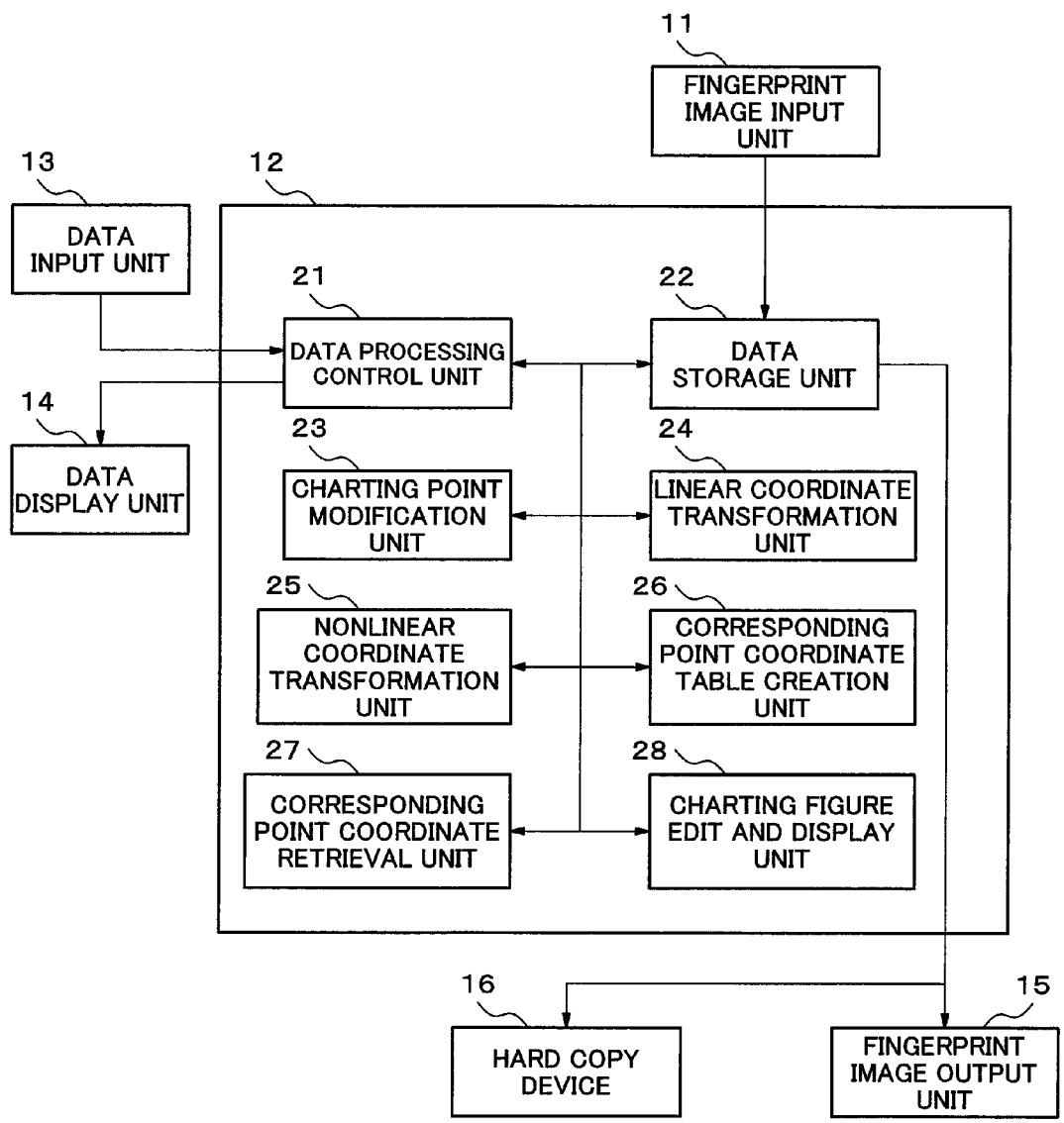
FIG. 2 shows an example of a configuration of a charting support unit 12.

FIG. 2 shows an example of a configuration of the charting support unit 12.

The charting support unit 12 includes a data processing control unit 21, a data storage unit 22, the charting point modification unit 23, a linear coordinate transformation unit 24, the nonlinear coordinate transformation unit 25, a corresponding point coordinate table creation unit 26, a corresponding point coordinate retrieval point 27 and the charting figure edit and display unit 28.

The data processing control unit 21 controls each unit, which composes the charting support unit 12, to send data and a message to another unit and to receive the data and the message from another unit.

The data storage unit 22 is, for example, RAM (Random Access Memory), and is used by each unit of the charting support unit 12 as a working area or the like. Moreover, each of the charting point modification unit 23, the linear coordinate transformation unit 24, the nonlinear coordinate transformation unit 25, the corresponding point coordinate table creation unit 26, the corresponding point coordinate retrieval unit 27 and the charting figure edit and display unit 28 use the data storage unit 22 as a working area.

The charting point modification unit 23 supports the examiner's inputting and modifying work related to corresponding points (a corresponding point is called a charting point) on two images.

The linear coordinate transformation unit 24 determines a coordinate transformation formula for minimizing difference (distance) between the coordinates of the charting points which are defined on two images respectively. The coordinate transformation formula is determined under the condition of a linear transformation.

To determine the coordinate transformation formula is to find a linear transformation formula for a whole of the image which makes a coordinate of a position of a charting point on one image close to a coordinate of a position of the corresponding charting point on the other image.

The nonlinear coordinate transformation unit 25 determines a coordinate transformation relation for matching two charting points which are defined on two images respectively. The coordinate transformation cannot be realized by the linear transformation. The nonlinear coordinate transformation unit 25 determines an amount of transformation (amount of movement) of any pixel on one image according to the interpolation method by use of an amount of movement of a nearby charting point, and a distance from the pixel to the nearby charting point. The image transformation by use of the amount of transformation based on the nonlinear coordinate transformation can rectify an image distortion.

The corresponding point coordinate table creation unit 26 creates a corresponding point coordinate table which stores a relation of correspondence between the coordinate of the pixel posterior to the nonlinear transformation, and the coordinate of the pixel prior to the nonlinear transformation.

The corresponding point coordinate table creation unit 26 registers a reverse relation between the coordinate of the pixel prior to the nonlinear transformation, and the coordinate of the pixel posterior to the nonlinear transformation in the corresponding point coordinate table.

The corresponding point coordinate retrieval unit 27 searches for the corresponding point coordinate table, and determines a coordinate of the pixel prior to the nonlinear transformation which is corresponding to the coordinate of the pixel designated on the nonlinear transformation image.

The charting figure edit and display unit 28 edits the relation of correspondence between two fingerprint images so that the examiner may understand easily the relation of correspondence between two fingerprint images.

The charting figure edit and display unit 28 makes the data display unit 14 display an edited image and a requested image such as the charting data on the basis of an examiner's instruction which is provided by the data input unit 13.

<Operation of Charting Support Processing Device 10>

Figure 3:
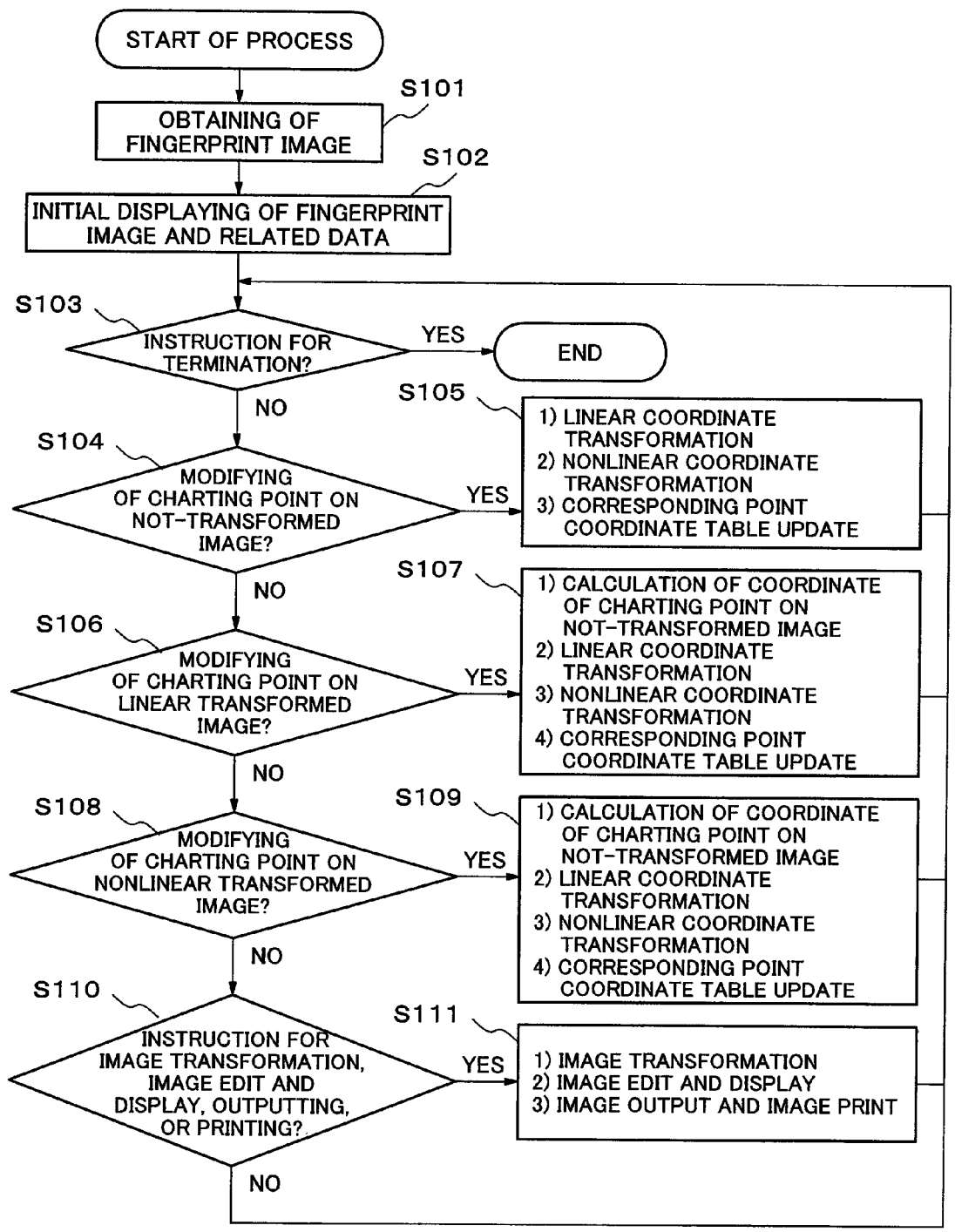
FIG. 3 shows an example of an operation of the charting support processing device 10.

FIG. 3 shows an operation of a whole of the charting support unit 12 which includes the fingerprint image input unit 11, the data input unit 13, the data display unit 14 and the fingerprint image output unit 15.

First, the fingerprint image input unit 11 obtains fingerprint images (Step S101).

Figure 4A:
FIG. 4A shows an example of a latent fingerprint which is used in charting.
Figure 4B:
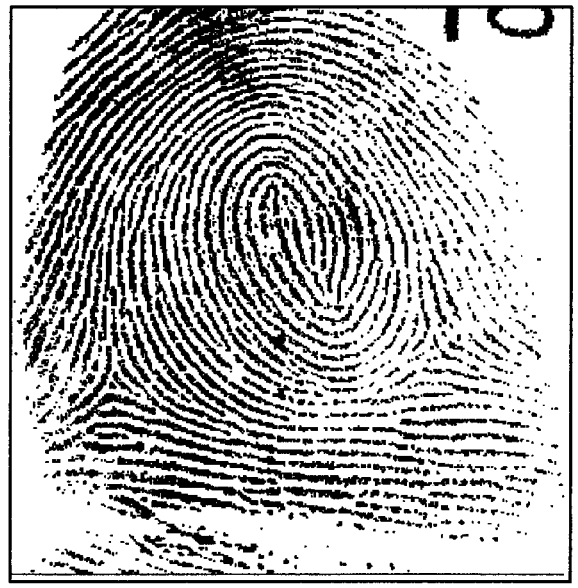
FIG. 4B shows an example of an image of an inked fingerprint which is used in the charting.

For example, the fingerprint image input unit 11 digitizes images which are read by a scanner and obtains the digitized image, or the fingerprint image input unit 11 obtains files of the fingerprint images which have been digitalized already. FIG. 4A and FIG. 4B show an example of fingerprint images which the fingerprint image input unit 11 obtains.

FIG. 4A shows an example of an image of a latent fingerprint, and FIG. 4B shows an example of an image of an inked fingerprint which is corresponding to the latent fingerprint.

The latent fingerprint, which means a fingerprint left behind at a scene of a crime, has low quality, and consequently automatic matching may be impossible in many cases. On the other hand, the inked fingerprint, which is taken for registration, has high quality. The inked fingerprint which is taken for a criminal, investigation is called specifically a rolled impression since the fingerprint is taken with making a finger rotated so that a wide area of the fingerprint may be taken.

Here, two fingerprints, which are objects for judgment on identity, will be described in the following. While both of the fingerprints may be latent fingerprints or inked fingerprints, it is usual that one out of two fingerprints is a latent fingerprint and the other is an inked fingerprint. For the sake of convenience, it is assumed that one out of two fingerprints, which are the objects for checking identity, is a latent fingerprint, and the other is an inked fingerprint.

FIG. 4A and FIG. 4B or the like show an example of the fingerprint images which are read by a sensor or a scanner and afterward is digitalized. The examples of the fingerprint images are digitized with resolution of 500 dpi according to ANSI/NIST-ITL-1-2000 Data Format for the Interchange of Fingerprint, Facial, & Scar Mark & Tattoo (SMT) Information which is standardized by American NIST (National Institute of Standards and Technology). Here, the standardized document is disclosed in NIST Special Publication 500-245 of ANSI/NIST-ITL 1-2000 Revision of ANSI/NIST-CSL 1-1993 & ANSI/NIST-ITL 1a-1997 [retrieved at Mar. 11, 2009], internet <URL:ftp://sequoyah.nist.gov/pub/nist_internal_reports/sp500-245-a16.pd.

Next, the charting figure edit and display unit 28 edits two fingerprint images, which are provided by the fingerprint image input unit 11, for an initial display and makes the data display unit 14 display the edited fingerprints (Step S102).

FIG. 5 is an example of the fingerprint image displayed on the data display unit 14. If there is no specific remark in this description, any figure included in the exemplary embodiment shows the latent fingerprint on the left side and the inked fingerprint on the right side of the side by side display. Moreover, it is assumed that the object for the coordinate transformation and the image transformation is the inked fingerprint which is displayed on the right side.

Next, the data processing control unit 21 carries out a process according to an input instruction issued by the examiner.

The data processing control unit 21 judges whether an input instruction issued by the examiner is an end instruction or not (Step S103). In the case that the input instruction is the end instruction (Yes in Step S103), the data processing control unit 21 ends the charting support process (End).

On the other hand, in the case that the input instruction is not the end instruction (No in Step S103), the data processing control unit 21 judges whether an input instruction issued by the examiner is an instruction for modifying charting points on the not-transformed image (Step S104).

In the case that the input instruction is the instruction for modifying charting points on the not-transformed image (Yes in Step S104), the charting point modification unit 23 carries out a support process for obtainment or modification work related to charting points, and advances the operation towards Step S105 after completion of the process.

In the description of the exemplary embodiment, the charting support processing device 10 carries out the linear transformation or the nonlinear transformation of the inked fingerprint shown on the right side in FIG. 4B, so as to make it similar in shape to the latent fingerprint shown on the left side in FIG. 4A. The not-transformed image means an image whose inked fingerprint remains as it is as the fingerprint on the input image, and for which the image transformation is not carried out. In an example of the side by side display shown in FIG. 5, an inked fingerprint on a right side image b is a not-transformed image O.

Inputting the charting points in FIG. 5 includes two steps of designating a charting point 51 of the latent fingerprint and designating a charting point 52 of the inked fingerprint. It may be preferable that inputting the charting points is carried out in a reverse order, that is, the designation of the charting point 52 of the inked fingerprint is carried out at first, and afterward the designation of the charting point 51 of the latent fingerprint is carried out.

In FIG. 5, a center of a short line (short ridge) is a first charting point. A small window which exists between the left image and the right image shows an enlarged view around each charting point of the left image and the right image.

The inked fingerprint image, which is not transformed and which is displayed in the right side window b in FIG. 5 or the like, means, in other word, an image whose position alignment for making the inked fingerprint image corresponding to the latent fingerprint image is not carried out. Accordingly, the inked fingerprint image which is not transformed is not corresponding well to the latent fingerprint. Therefore, a position of the charting point 51 of the latent fingerprint in the display window, and a position of the charting point 52 of the inked fingerprint in the display window are different.

In order to explain a relation between the positions in two display windows, other charting points (bifurcations 53 and 54) are exemplified. A cursor mark 55 is placed (pointing) so that the cursor mark 55 may indicate the charting point 53 in a left side display window a. A position indicated by a cursor mark 56 in the right side display window b in FIG. 5 is identical to one of the cursor mark 55 in the left side display window a. A function to display one cursor at a position in one display window, and the other cursor at the same position in the other display window is called double cursor function.

The cursor mark 56 is far from the charting point 54. If, for example, the position alignment of the image in the right side display window b to the image in the left side display window a can be carried out through transforming the image in the right side display window b, a distance between the two points becomes short apparently.

The charting support processing device 10 according to the exemplary embodiment makes two points close through carrying out the coordinate transformation by use of the coordinates of the charting points at a time when one or more than one pairs of charting points are inputted.

For example, when one pair of charting points is designated for inputting, the charting support processing device 10 moves the image in the right side display window b in parallel so that the coordinate of the charting point in the right side display window b matches the coordinate of the charting point in the left side display window a.

Moreover, when two pairs of charting points are designated for inputting, the charting support processing device 10 moves the image in the right side display window b in parallel so that a central coordinate of the two charting points in the right side display window b matches a central coordinate of the two charting points in the left side display window a. Next, the charting support processing device 10 rotates the image in the right side display window b so that an angle of a line between the two charting points in the right side display window b matches an angle of a line between the two charting points in the left side display window a.

Moreover, when more than two charting points are designated for inputting, the charting support processing device 10 carries out the linear transformation of the image in the right side display window b with a usual image transformation technology such as the Helmert transformation mentioned later.

In the case that the image in the left side display window a, and the image in the right side display window b which is transformed in the above-mentioned way are displayed side by side, the points which are pointed by the double cursor become well corresponding each other. In other words, for example, in the case that the examiner places the double cursor at a new charting point a on the image in the left side display window a, a distance between a double cursor point on the image in the right side display window b, and the charting point on the image in the right side display window b, which is corresponding with the charting point a, becomes short.

As a result, the charting support processing device 10 can reduce an amount of movement of the cursor which the examiner moves at a time when the examiner designates the new charting point. In other words, when the examiner places the double cursor at the charting point on the image in the left side display window a, the charting support processing device 10 focuses another cursor (move the cursor and make it effective) on a point which is at the same position in the right side display window b (candidate point for the charting point on the image in the right side display window b). What is left for the examiner to do is to move the cursor from the candidate point to a true charting point. Accordingly, the charting support processing device 10 can reduce an amount of works for designating the charting point of the image in the right side display window b.

A combination of the image transformation and the double cursor reduces the amount of works for designating new charting points, and furthermore makes it easy to search new charting points. For example, when the examiner designates the candidate point for a charting point on the left side image by use of the cursor, a range for searching for a point corresponding to the candidate point is limited only to an area around the point, which is designated by the double cursor, on the right side image.

It is ideal that an image transformation, which can make the charting points on the left image and on the right image match the points designated by the double cursor, is realized. If the ideal image transformation is realized, it is furthermore easy to search and designate new charting points.

However, it is impossible to make the coordinates of the charting points of two images match with each other even if the image is transformed by use of the linear transformation since the fingerprint image, especially, the latent fingerprint image is remarkable distorted.

In order to realize the image transformation which can make the coordinates of the charting points of two images match with each other, the charting support processing device 10 according to the exemplary embodiment carries out also the nonlinear image transformation which can rectify the image distortion.

<Image Transformation Process which is Carried Out in the Case of Charting Point Modification on not-Transformed Image>

An image transformation process, which is carried out in the case that an instruction issued by the examiner is, an instruction for modifying the charting point on the not-transformed image, includes three sub-steps as follows.

Sub step 1: linear coordinate transformation
Sub step 2: nonlinear coordinate transformation
Sub step 3: corresponding point coordinate table update It is not mandatory that the charting support processing device 10 carries out three sub-steps mentioned above in advance before modifying the charting point. But it is possible that the charting support processing device 10 displays the requested image instantaneously in the case that the examiner requests to display the linear transformed image or the nonlinear transformed image, if the sub-steps are carried out in advance.

<Sub Step 1: Linear Coordinate Transformation>

The linear coordinate transformation unit 24 determines a linear coordinate transformation formula for minimizing difference (distance) in a distance between the charting points which are designated on two images respectively. The linear coordinate transformation means a coordinate transformation of a first degree equation which is applicable to a coordinate on a whole of the image. The linear transformation can include rotating the image, and moving the image in parallel, and expanding and contracting the image.

Since an image which is transformed by use of the linear transformation does not include the modification of the image distortion, the transformed image matches well with the image prior to the transformation. Therefore, it is recognized commonly that the transformed image can be used as a trial evidence with no problem.

According to the exemplary embodiment, the Helmert transformation is used as the linear transformation method. The Helmert transformation, which is adopted widely for processing a document such as a map, carries out an approximate calculation of a transformation formula on the basis of a plurality of coordinates of corresponding points. Since the Helmert transformation guarantees a similar type image posterior to the transformation, the Helmert transformation is called also similar type transformation. The Helmert transformation is easy to carry out an inverse transformation which calculates a coordinate prior to the transformation from a coordinate posterior to the transformation.

Figure 6:
FIG. 6 shows an example of the side by side display of the latent fingerprint and the inked fingerprint which is transformed by use of a linear transformation.

The right side image b in FIG. 6 is an image L which is transformed by use of the linear coordinate transformation formula. The image L is an exemplified image which is transformed by use of the coordinate transformation based on only three charting points shown in FIG. 6.

A cursor mark 61 indicates a peak point of a skeleton (most inner ridge) of the fingerprint on the left side image a as shown in FIG. 6. The peak point is a new candidate for a charting point. A double cursor 62 corresponding to the cursor mark 61 indicates a point which is far from a peak point of a skeleton of the right side image b by about 20 pixels (corresponding to actual distance of 1 millimeter). The correspondence between the left side image and the right side image in FIG. 6 is improved remarkably in comparison with one in FIG. 5.

<Sub Step 2: Nonlinear Coordinate Transformation>

The nonlinear coordinate transformation unit 25 determines a coordinate transformation method to make the coordinates of the charting points, which are designated on the two images respectively, match with each other.

The nonlinear coordinate transformation unit 25 determines an amount of transformation (amount of movement) of any pixel on one image according to the interpolation method by use of an amount of movement of a nearby charting point, and a distance from the pixel to the nearby charting point. The charting support processing device 10 can make the coordinates of the charting points on two images matches with each other and can make a nearby pixel distorted smoothly through carrying out the image transformation by use of the amount of transformation. Since the coordinate transformation is not linear (coordinate transformation formula cannot be expressed by a first degree equation), the coordinate transformation is called nonlinear transformation.

The nonlinear coordinate transformation unit 25 according to the exemplary embodiment uses not the coordinate on the not-transformed image O but the coordinate on the linear transformed image L in the nonlinear coordinate transformation process. Since the nonlinear coordinate transformation according to the exemplary embodiment uses the amount of movement of the nearby charting point, the coordinate of the pixel which exists far from the charting point may not be transformed appropriately. The nonlinear coordinate transformation unit 25 can reduce the disadvantage through using the coordinate of the linear transformed image L. As a result, the nonlinear coordinate transformation unit 25 can make the image posterior to the nonlinear transformation more natural.

The nonlinear coordinate transformation according to the exemplary embodiment can be realized by use of a publicly known technology which is disclosed in Japanese Patent Application Laid-Open No. 1995-114649 or the like. Japanese Patent Application Laid-Open No 1995-114649 discloses a method to reduce distortion through designating a vector on a point on the image, and deforming the image on the basis of the vector. In the case of adopting the method described in Japanese Patent Application Laid-Open No. 1995-114649, the nonlinear coordinate transformation unit 25 sets that the vector originates at a position of a charting point of the inked fingerprint side, and terminates at a position of the charting point of the latent fingerprint side which is corresponding to the charting point on the inked fingerprint side. Then, by use of the method described in Japanese Patent Application Laid-Open No 1995-114649, the nonlinear coordinate transformation unit 25 determines a movement vector of each pixel according to the interpolation method. The coordinate of the termination point of the movement vector which is determined with the method mentioned above is a coordinate of pixel posterior to the nonlinear transformation.

Here, it may be preferable that the charting support processing device 10 registers the coordinate of the pixel posterior to the nonlinear transformation correspondingly to the coordinate of the pixel prior to the transformation in a coordinate transformation table. If the coordinates are registered, the charting support processor 10 can search the coordinate of any pixel posterior to the transformation instantaneously.

Figure 7:
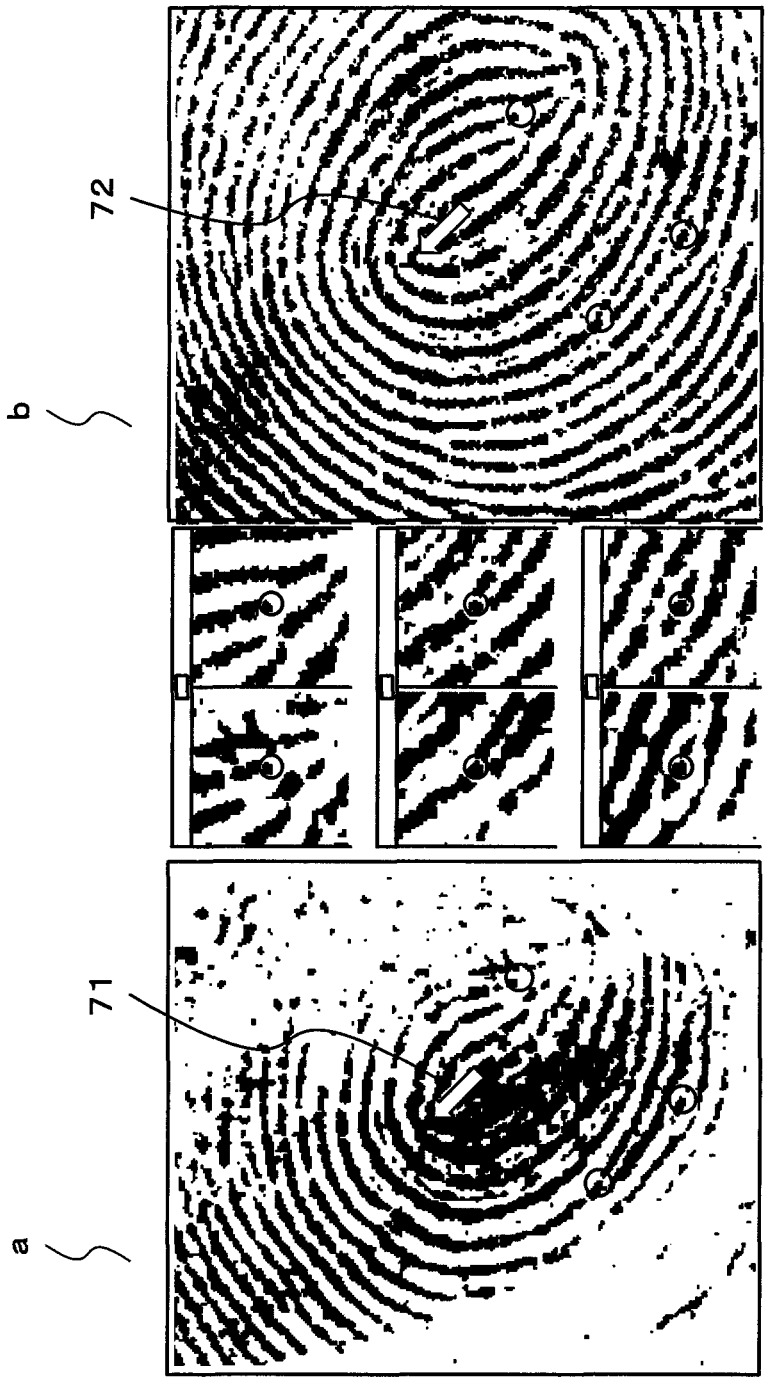
FIG. 7 shows an example of the side by side display of the latent fingerprint and the inked fingerprint which is transformed by use of a nonlinear transformation.

The right side image b in FIG. 7 is a nonlinear transformed image N which is transformed by use of the coordinate transformation table created as mentioned above.

The image N is an example of the image for which the coordinate transformation is carried out by use of only three charting points as shown in FIG. 6 and FIG. 7. In FIG. 7, a cursor mark 71 indicates a peak point of a skeleton of the fingerprint of the left side image a. This peak point is a new candidate for a charting point. A double cursor 72 corresponding to the cursor mark 71 indicates a point far by 6 pixels (corresponding to actual distance of 0.3 millimeter) from a peak point of a skeleton of the fingerprint of the right side image. The correspondence between the left side image and the right side image in FIG. 7 is improved furthermore in comparison with one in FIG. 6.

<Sub Step 3: Corresponding Point Coordinate Table Update>

The nonlinear coordinate transformation can not express the correspondence between the coordinate of the pixel posterior to the transformation and the coordinate of the pixel prior to the transformation with one formula as mentioned above. In this case, it is effective to register the correspondence between the coordinate of the pixel image posterior to the transformation and the coordinate of the pixel mage prior to the transformation in the coordinate transformation table in order to realize high speed coordinate transformation. A normal order coordinate transformation table registers the coordinate of the pixel posterior to the transformation correspondently to the coordinate of the pixel prior to the transformation. A reverse order coordinate transformation table registers the coordinate of the pixel prior to the transformation correspondently to the coordinate of the pixel posterior to the transformation in a reverse order. The corresponding point coordinate table includes these two tables. Here, the reverse order coordinate transformation table registers the coordinates in an order reverse to the order of the coordinates registered in the normal order coordinate transformation table.

The corresponding point coordinate table creation unit 26 updates the corresponding point coordinate table, which is related to all pixels, by use of a coordinate of a charting point inputted at the point of time ("update" includes initial creation).

Next, the data processing control unit 21 judges whether an instruction issued by the examiner is an instruction for modifying charting points on the linear transformed image (Step S106). In the case of the instruction for modifying charting points on the linear transformed image (Yes in Step S106), the charting point modification unit 23 carries out a support process for obtainment or modification work related to charting points. When the process is completed, the operation advances towards Step S107.

<Image Transformation Process Carried Out when Modifying Charting Point on Linear Transformed Image>

An image transformation process, which is carried out in the case that an instruction issued by the examiner is an instruction for modifying charting points on the linear transformed image, includes four sub-steps as follows.

Sub step 1: calculation of coordinate of charting point on not-transformed image
Sub step 2: linear coordinate transformation
Sub step 3: nonlinear coordinate transformation
Sub step 4: corresponding point coordinate table update It is not mandatory that the charting support processing device 10 carries out four sub-steps mentioned above in advance before modifying the charting point. But it is possible that the charting support processing device 10 displays the requested image instantaneously in the case that the examiner requests to display the linear transformed image or the nonlinear transformed image, if the sub-steps are carried out in advance.

<Sub Step 1: Calculation of Coordinate of Charting Point on not-Transformed Image>

1: The linear coordinate transformation unit 24 calculates the coordinate on the not-transformed image corresponding to the coordinate of the charting point which is modified or added on the linear transformed image. The linear coordinate transformation unit 24 calculates the coordinate by use of an inverse transformation formula of the linear coordinate transformation formula which is determined in the latest linear coordinate transformation process.

<Sub Step 2: Linear Coordinate Transformation>

2: A linear coordinate transformation is the same as one in Step S105. However, the linear coordinate transformation unit 24 uses the coordinate of the not-transformed image which is calculated in "1: calculation of coordinate of charting point on not-transformed image" mentioned above.

<Sub Step 3: Nonlinear Coordinate Transformation>

3: A nonlinear coordinate transformation is the same as one in Step S105. However, the nonlinear coordinate transformation unit 25 uses the coordinate on the image posterior to the transformation which is calculated in "2: linear coordinate transformation" mentioned above.

<Sub Step 4: Coordinate Corresponding Point Table Update>

4: A coordinate corresponding point table update process is the same as the process in Step S105.

Next, the data processing control unit 21 judges whether an instruction issued by the examiner is an instruction for modifying charting points on the nonlinear transformed image (Step S108). In the case of the instruction for modifying charting points on the nonlinear transformed image (Yes in Step S108), the charting point modification unit 23 carries out a support process for obtainment or modification work related to charting points. When the process is completed, the operation advances towards Step S109.

<Image Transformation Process Carried Out in the Case of Charting Point Modification of Nonlinear Transformed Image>

An image transformation process, which is carried out in the case that an instruction issued by the examiner is an instruction for modifying charting points on the nonlinear transformed image, includes four sub-steps as follows.

Sub step 1: calculation of coordinate of charting point on not-transformed image
Sub step 2: linear coordinate transformation
Sub step 3: nonlinear coordinate transformation
Sub step 4: corresponding point coordinate table update It is not mandatory that the charting support processing device 10 carries out the four sub-steps mentioned above in advance before modifying the charting point. But it is possible that the charting support processing device 10 displays the requested image instantaneously in the case that the examiner requests to display the linear transformed image or the nonlinear transformed image, if the sub-steps are carried out in advance.

<Sub Step 1: Calculation of Coordinate of Charting Point on not-Transformed Image>

1: The charting support processing device 10 calculates a coordinate on the not-transformed image corresponding to the coordinate of the charting point which is modified or added on the linear transformation image. The calculation includes two procedures shown in the following.

First, the nonlinear coordinate transformation unit 25 searches and determines a coordinate of the charting point on the linear transformed image by use of the reverse order coordinate transformation table of the corresponding point coordinate table.

Next, the liner coordinate transformation unit 24 calculates a coordinate on the not-transformed image by use of the inverse transformation formula of the linear coordinate transformation formula, which is determined in the latest linear coordinate transformation process, on the basis of the coordinate of the charting point on the linear transformed image.

<Sub Step 2: Linear Coordinate Transformation>

2: A linear coordinate transformation process is the same as the process in Step S107. However, the linear coordinate transformation unit 24 uses the coordinate on the not-transformed image which is calculated in "1: calculation of coordinate of charting point on not-transformed image".

<Sub Step 3: Nonlinear Coordinate Transformation>

3: A nonlinear coordinate transformation process is the same as process in Step S107. However, the nonlinear coordinate transformation unit 25 uses the coordinate on the image posterior to the linear transformation which is calculated in "2: linear coordinate transformation".

<Sub Step 4: Corresponding Point Coordinate Table Update>

4: A corresponding point coordinate table update process is the same as the process in Step S107.

Next, the data processing control unit 21 judges whether an instruction issued by the examiner is an instruction for the image transformation, the image edit and display, outputting, or printing (Step S110). In the case of the instruction for the image transformation, the image edit and display, outputting, or printing, the operation advances towards Step S111.

First, according to the examiner's instruction which is provided by the data input unit 13, the charting figure edit and display unit 28 transforms a requested image if necessary. The charting figure edit and display unit 28 makes the data display unit 15 display and print the edited image and the charting data.

The charting figure edit and display unit 28 transmits the transformed image to an external device or provides an external storage medium or the like with the transformed image as digital data.

<Work and Effect of Charting Support Processing Device 10>

Figure 8:
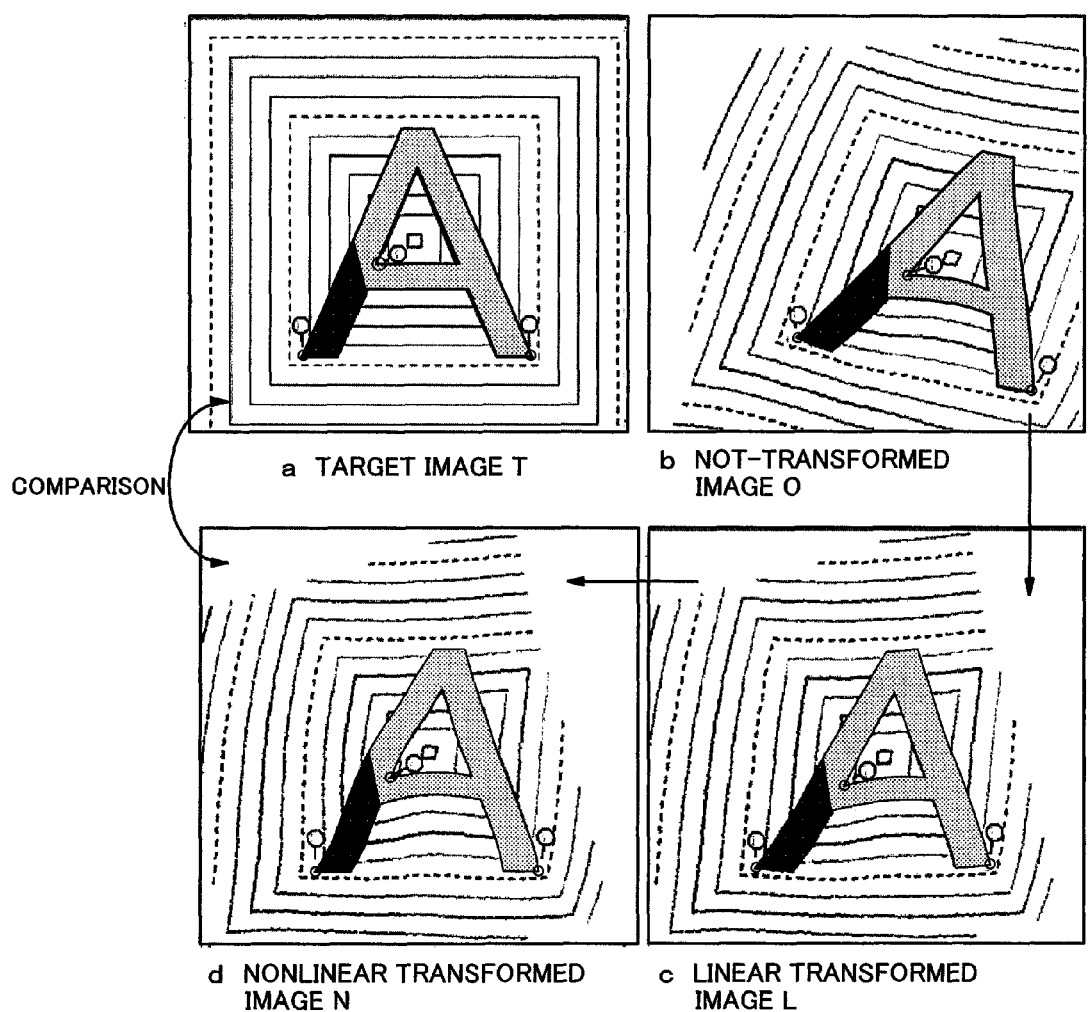
FIG. 8 is a diagram for explaining an effect of an image transformation.

FIG. 8 *a* and FIG. 8 *b* show images in which a character "A" is used as an example created in order to explain a work and an effect of the charting support processing device 10 according to the exemplary embodiment.

FIG. 8 *a* shows an original image, that is; a target image T. FIG. 8 *b* shows the not-transformed image O which is obtained by deforming the target T, that is, by rotating and moving in parallel the target T, and providing with a trapezoid distortion and a nonlinear random distortion.

Even if there are only a few charting points between the not-transformed image O and the target image T, the charting support processing device 10 according to the exemplary embodiment can transform the not-transformed image and make it similar to the target image T efficiently.

According to the exemplary embodiment, the charting support processing device 10 carries out the image transformation by use of three charting points which are indicated on each of the non-transformed image O and the target image T. FIG. 8 *c* shows the image L for which the linear transformation, that is, the Helmert transformation mentioned in the exemplary embodiment is carried out.

FIG. 8 *d* shows the image N posterior to the nonlinear transformation. FIG. 8 *d* shows that an area surrounded by three designated charting points and its nearby area are transformed to become similar to the target image T.

However, according to the image shown in FIG. 8 *d*, an upper part and a lower part of the character "A" are connected unnaturally, and consequently the image becomes unnatural as a whole, since the upper part of the character "A", where is far from the charting point, is not transformed appropriately.

Second Exemplary Embodiment

Figure 9:
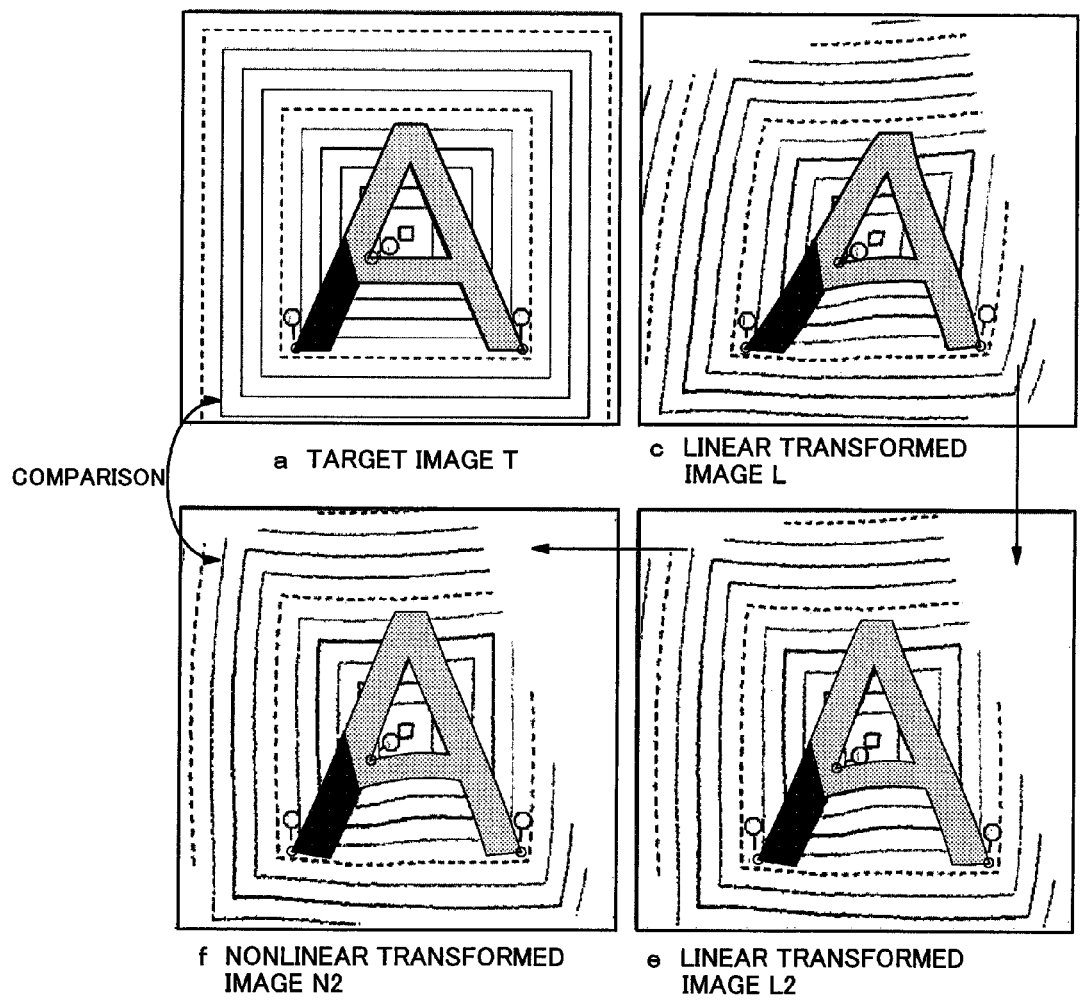
FIG. 9 is another diagram for explaining the effect of the image transformation.

FIG. 9 *a* and FIG. 9 *c*, which are the same as FIG. 8 *a* and FIG. 8 *c* respectively, are shown again in order to make comparison with FIG. 9 *e* and FIG. 9 *f* easy.

According to a second exemplary embodiment, the linear coordinate transformation of sub step 1 of Step S105, sub step 2 of Step S107 and sub step 2 of Step S109 in FIG. 3 are changed as follows.

In this sub step, the linear coordinate transformation unit 24 shown in FIG. 2 determines a linear coordinate transformation formula for minimizing difference (distance) between the coordinates of the charting points which are defined on two images respectively. First, the linear coordinate transformation unit 24 according to the second exemplary embodiment carries out the Helmert transformation which is adopted in the first exemplary embodiment.

Next, the linear coordinate transformation unit 24 tries to make a coordinate of the charting point, which is transformed with the Helmert transformation, approximate to the coordinate of the charting point on the target image (T) through expanding and contracting the coordinate of the charting point, which is transformed with the Helmert transformation, in the horizontal direction and in the vertical direction.

In the following formulas, n denotes number of the charting points, and Px (k) denotes a X-coordinate of a k'th charting point on the non-transformed image, and Tx (k) denotes a X-coordinate of a k'th charting point on the target image, and PxC denotes a X-coordinate of the center of gravity of all charting points on the non-transformed image, and TxC denotes a X-coordinate of the center of gravity of all charting points on the target image, and h denotes expansion ratio in a X-direction. The linear coordinate transformation unit 24 finds h through solving the following n formulas approximately.

$$(Tx(1) - TxC) = h * (Px(1) - PxC)$$
$$\vdots$$
$$(Tx(n) - TxC) = h * (Px(n) - PxC)$$

A coordinate transformation formula will be expressed in the next formula. Here, Qx(k) means an X-coordinate posterior to the coordinate transformation.

$$Qx(k) = Px(k) + h*(Px(k) - PxC)$$

Similarly, the linear coordinate transformation unit 24 obtains also expansion ratio in the vertical direction and a coordinate transformation formula.

While the process mentioned above (Helmert transformation, and expansion and contraction in the horizontal and in the vertical direction) is realized with the Affine transformation, it is complicate to determine a parameter for the most suitable Affine transformation.

Next, the linear coordinate transformation unit 24 tries to make the coordinate of the charting point, which is adjusted by the expansion and the contraction in the horizontal and vertical directions, approximate to the coordinate of the target image (T) through adding simple skew (skew; slant distortion) modification to the coordinate of the charting point.

In the following formulas, n denotes number of the charting points, and (Px(k) and Py(k)) denotes a coordinate of a k'th charting point on the non-transformed image, and (Tx(k) and Ty(k)) denotes a coordinate of a k'th charting point on the target image, and v denotes a skew modification coefficient in a Y-direction. The linear coordinate transformation unit 24 finds v through solving the following n formulas approximately.

$$Px(1) - Ty(1) = v * Px(1)$$
$$\vdots$$
$$Px(n) - Ty(n) = v * Px(n)$$

A coordinate transformation formula will be expressed in the next formula. Here, Qy(k) denotes a Y-coordinate posterior to the coordinate transformation.

$$Qy(k)=Py(k)+v*Px(k)$$

Similarly, the linear coordinate transformation unit 24 obtains also expansion ratio in the vertical direction and a coordinate transformation formula.

Since the image transformation including the skew modification is not the equiangular transformation, the image transformation including the skew modification is not the linear transformation in the strict sense of the word. However, the transformation can be expressed by a first degree equation, and an image posterior to the transformation is almost natural. Therefore, according to the exemplary embodiment, it is assumed that the transformation is included in the linear transformation and is carried out.

FIG. 9 *e* shows a linear transformed image L2 which is transformed by use of the linear coordinate transformation in the way mentioned above. The image shown in FIG. 9 *e* is natural in comparison with the linear transformed image L shown in FIG. 9 *c*, and becomes more similar to the target image T shown in FIG. 9 *a* than the linear transformed image L according to the first exemplary embodiment.

FIG. 9 *f* shows a nonlinear coordinate transformed image N2 which is obtained through carrying out the nonlinear coordinate transformation process by use of the coordinate shown in FIG. 9 *e*, and transforming the image by use of the result of the nonlinear coordinate transformation. The image is natural in comparison with the nonlinear transformed image N shown in FIG. 8 *d*, and becomes more similar to the target image T shown in FIG. 9 *a*.

It may be preferable that the linear coordinate transformation unit 24 according to another exemplary embodiment adds trapezoid distortion modification as the linear coordinate transformation which can be expressed by a first degree equation.

(Work and Effect of Second Exemplary Embodiment)

Figure 11:
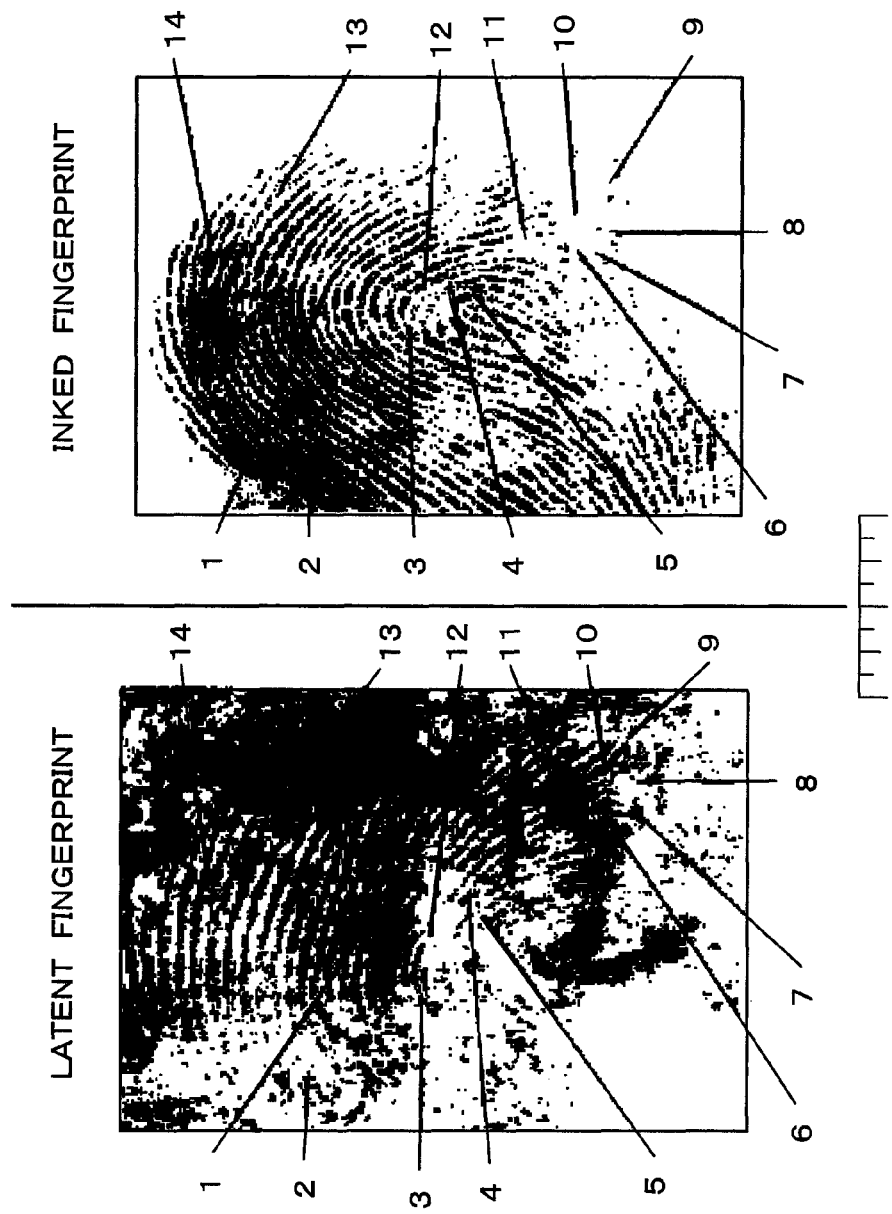
FIG. 11 shows an example of false analysis.

FIG. 11 shows an example of the charting figures causing a false analysis.

The examiner designates 14 charting points shown in FIG. 11, and judged that the fingerprints are identical with each other since each corresponding charting points are coincident with each other, and finally the judgment resulted in the false analysis.

The nonlinear transformed image, which the charting support processing device 10 according to the exemplary embodiment outputs, is useful for preventing the false analysis.

Figure 12:
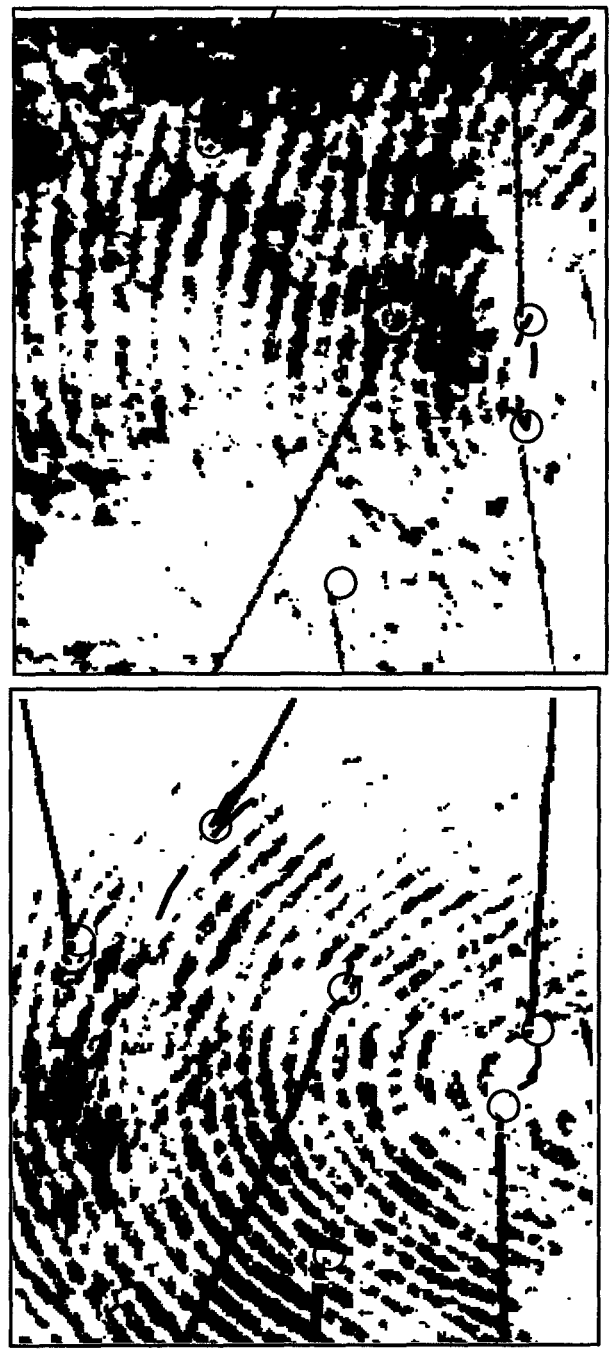
FIG. 12 shows an example of the side by side display, which is displayed in the case of the false analysis and which displays the inked fingerprint and the latent fingerprint transformed by use of the linear transformation.

FIG. 12 shows an image which is obtained through carrying out the linear image transformation process by use of 6 charting points, which are positioned on the upper side, out of 14 charting points designated by the examiner, and which is displayed side by side together with the latent fingerprint image. Even if these two images are compared, the ridges which are different with each other in a shape can not be found easily.

Figure 13:
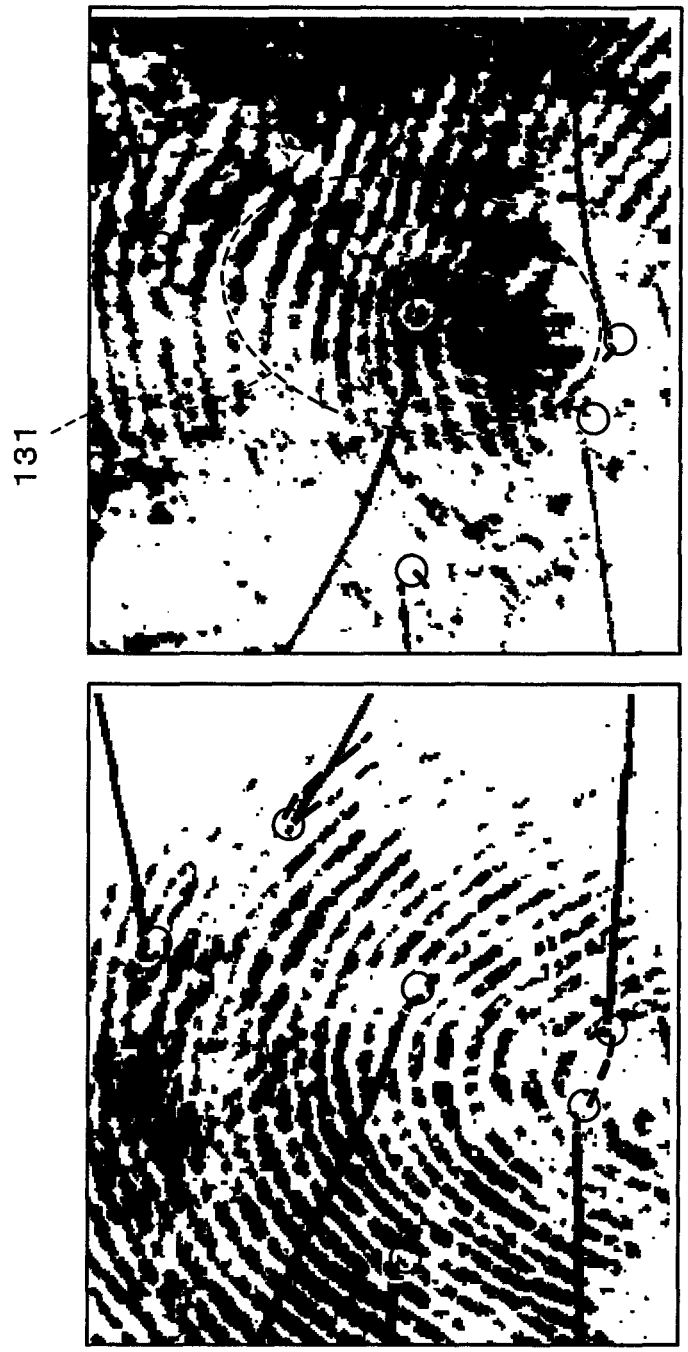
FIG. 13 shows an example of the side by side display of the inked fingerprint and the latent fingerprint transformed by use of the nonlinear transformation which is displayed in the case of the false analysis.

FIG. 13 shows an image which is obtained through carrying out the nonlinear image transformation by use of the same 6 charting points, and which is displayed side by side together with the latent fingerprint image. Comparing two images, it is found that width of the ridge in a lower part of an area 131 becomes wider than one in an upper part of the area 131 and the width of the ridge in the upper part of the area 131 extremely narrow, and consequently the image becomes unnatural.

While the examiner, who is influenced by prejudice that the latent fingerprint is distorted remarkably, does not sense difference between the two images when the examiner watches FIG. 12, the examiner senses visually remarkable difference when comparing two images in FIG. 13. As a result, the examiner analyzes the fingerprint carefully, and consequently it is possible to prevent the false analysis.

As mentioned above, since the charting support processing device 10 can carry out the nonlinear image transformation which outputs quite natural images even in the case of using small number of the charting points which are inputted manually, the charting support processing device 10 according to the exemplary embodiment is effective for supporting the analysis work.

Here, the exemplary embodiment mentioned above is the preferred exemplary embodiment according to the present invention, and the scope of the present invention is not limited to only the above-mentioned exemplary embodiment. Various changes in form and details can be made therein without departing from the spirit and scope of the present invention.

For example, while the fingerprint image is exemplified according to the above-mentioned embodiment, the present invention is also applicable to an apparatus or the like for analyzing a palm print or the like which has a pattern similar to the finger print.

An operator of the charting support processing device 10 according to the present invention is not limited to the examiner. It is apparent that a person other than an expert on the analysis can also operate the charting support processing device 10.

The control process of each unit which composes the charting support processing device 10 can be carried out by use of hardware, software or a combination of the hardware and the software.

In the case that the processes are carried out by use of software, it is possible to install a program, which records a sequence of the processes, in a memory of a computer which is equipped with a dedicated hardware, and to execute the program.

For example, it is possible to record the program beforehand in a hard disk or ROM (Read Only Memory) which is recording media. Or, it is possible to store (record) the program in a removable recording medium temporarily or permanently. It is possible to provide the removable recording medium as so-called packaged software. Here, a floppy (registered trademark) disk, CD-ROM (Compact Disc Read Only Memory), a MO (Magneto optical) disk, DVD (Digital Versatile Disc), a magnetic disk and a semiconductor memory are exemplified as the removable recording medium.

Here, the program is installed in the computer from the removable recording medium mentioned above. Or, the program is transferred from a download site to the computer through a wireless network or a wired network.

While the charting support processing device 10 according to the exemplary embodiment carries out the processes mentioned above sequentially, the operation of the charting support processing device 10 is not limited to the sequential operation. That is, it is also possible that the charting support processing device 10 is configured so that the charting support processing device 10 may carry out the processes simultaneously or separately on the basis of processing capability of the device which carries out the processes, or on the basis of necessity.

The present invention is applicable to a device which supports to analyze two images (judgment on existence of difference) such as the fingerprint and the palm print.

This application is based upon and claims the benefit of priority from Japanese Patent Application No. 2009-074501, filed on Mar. 25, 2009, the disclosure of which is incorporated herein in its entirety by reference.

The invention claimed is:

1. A stripe pattern image analysis device, comprising:
a charting point modification unit which obtains or modifies i) a first point located on a first stripe pattern image displayed in a first window, and ii) a second point which corresponds to the first point and is located on a second stripe pattern image displayed in a second window;
a nonlinear coordinate transformation unit which transforms the first stripe pattern image by use of a nonlinear coordinate transformation so that a first coordinate of the first point in the first window matches a second coordinate of the second point in the second window; and
a charting figure edit and display unit which displays the first stripe pattern image transformed by the nonlinear coordinate transformation unit by use of the nonlinear coordinate transformation, in the first window,
wherein the charting point modification unit includes a double cursor unit that, in an event where a first cursor is moved to a coordinate of a candidate for a point in one of the first and second windows, causes a second cursor to be indicated at a same coordinate in the other of the first and second windows, and
wherein the charting point modification unit, in an event where a charting point is placed on one image displayed in one of the first and second windows, displays a candidate point for the charting point at a same coordinate on an other image displayed in the other of the first and second windows and focuses a cursor on the candidate point.

2. The stripe pattern image analysis device according to claim 1, further comprising:
a linear coordinate transformation unit which carries out a linear transformation of the first stripe pattern image so that the first coordinate and the second coordinate are approximate,
wherein the nonlinear coordinate transformation unit carries out the nonlinear coordinate transformation of the first stripe pattern image which is transformed by the linear coordinate transformation unit.

3. The stripe pattern image analysis device according to claim 2, wherein the linear coordinate transformation unit carries out the linear transformation of the first stripe pattern image by carrying out a Helmert transformation, modification to one of expand or contract the first stripe pattern image in one of the horizontal direction or the vertical direction, and skew modification.

4. A stripe pattern image analysis method, comprising:
carrying out a charting point modification for obtaining or modifying i) a first point located on a first stripe pattern image displayed in a first window, and ii) a second point which corresponds to the first point and is located on a second stripe pattern image displayed in a second window;
carrying out a nonlinear coordinate transformation for transforming the first stripe pattern image by use of a nonlinear coordinate transformation so that a first coordinate of the first point in the first window matches a second coordinate of the second point in the second window; and
carrying out a charting figure edit and display for displaying the first stripe pattern image, which is transformed by use of the nonlinear coordinate transformation in the nonlinear coordinate transformation, in the first window,
wherein, in an event where a first cursor is moved to a coordinate of a candidate for a point in one of the first and second windows, a second cursor is caused to be indicated at a same coordinate in the other of the first and second windows, and
wherein, in an event where a charting point is placed on one image displayed in one of the first and second windows, a candidate point is displayed for the charting point at a same coordinate on an other image displayed in the other of the first and second windows and focuses a cursor on the candidate point.

5. The stripe pattern image analysis method according to claim 4, further comprising:
carrying out a linear coordinate transformation for carrying out a linear transformation of the first stripe pattern image so that the first coordinate and the second coordinate are approximate; and
carrying out the nonlinear coordinate transformation for transforming the first stripe pattern image, which is transformed by use of the linear transformation in the linear coordinate transformation, by use of the nonlinear transformation.

6. The stripe pattern image analysis method according to claim 5, comprising:
carrying out the linear coordinate transformation for carrying out the linear transformation of the first stripe pattern image through carrying out a Helmert transformation, a modification to one of expand or contract the first stripe pattern image in one of the horizontal direction or in the vertical direction, and a skew modification.

7. A non-transient computer readable media on which a program is stored wherein the program makes a computer execute:
a charting point modification process to input or to modify i) a first point located in a first stripe pattern image displayed in a first window and ii) a second point which corresponds to the first point and is located on a second stripe pattern image displayed in a second window;
a nonlinear coordinate transformation process to transform the first stripe pattern image by use of a nonlinear coordinate transformation so that a first coordinate of the first point in the first window matches a second coordinate of the second point in the second window; and
a charting figure edit and display process to display the first stripe pattern image, which is transformed by use of the nonlinear transformation in the nonlinear coordinate transformation process, in the first window,
wherein, in an event where a first cursor is moved to a coordinate of a candidate for a point in one of the first and second windows, the charting point modification process causes second cursor to be indicated at a same coordinate in the other of the first and second windows, and
wherein, in an event where a charting point is placed on one image displayed in one of the first and second windows, the charting point modification process displays a candidate point for the charting point at a same coordinate on an other image displayed in the other of the first and second windows and focuses a cursor on the candidate point.

8. The non-transient computer readable media according to claim 7 on which the program is stored, wherein the program further makes the computer execute:
a linear coordinate transformation process to carry out a linear transformation of the first stripe pattern image so that the first coordinate and the second coordinate are approximate; and the nonlinear coordinate transformation process to carry out a nonlinear transformation of the first stripe pattern image transformed by use of the linear transformation in the linear coordinate transformation process.

9. The non-transient computer readable media according to claim 8, on which the program is stored wherein the program makes the computer execute:
the linear coordinate transformation process to carry out the linear transformation of the first stripe pattern image through carrying out a Helmert transformation, a modification to one of expand or contract the first stripe pattern image in one of the horizontal direction or in the vertical direction, and a skew modification.

* * * * *